United States Patent [19]

Staerzl

[11] Patent Number: 4,532,903
[45] Date of Patent: Aug. 6, 1985

[54] BINARY AND PROPORTIONAL CONTROL FOR A FEEDBACK CARBURETOR

[75] Inventor: Richard E. Staerzl, Fond du Lac, Wis.

[73] Assignee: Brunswick Corporation, Skokie, Ill.

[21] Appl. No.: 589,235

[22] Filed: Mar. 14, 1984

[51] Int. Cl.³ .......................... F02P 5/04; F02B 33/00
[52] U.S. Cl. ................................. 123/436; 123/419; 123/344; 123/438
[58] Field of Search ............... 123/438, 440, 344, 419, 123/436

[56] References Cited

U.S. PATENT DOCUMENTS

| 677,014 | 6/1901 | Buck | 123/344 |
| 709,059 | 9/1902 | Strang | 123/344 |
| 3,768,259 | 10/1973 | Carnahan | 123/438 |
| 3,789,816 | 2/1974 | Taplin | 123/436 |
| 3,921,612 | 11/1975 | Aono | 123/436 |
| 4,099,493 | 7/1978 | Latsch | 123/436 |
| 4,138,975 | 2/1979 | Hamelin | 123/436 |
| 4,368,707 | 1/1983 | Leshner | 123/436 |
| 4,372,269 | 2/1983 | Coles | 123/436 |

Primary Examiner—Ronald B. Cox
Attorney, Agent, or Firm—Hopgood, Calimafde, Kalil, Blaustein & Judlowe

[57] ABSTRACT

A control system for a feedback carburetor in which a controlled vacuum is applied to the carburetor fuel bowl to reduce the fuel flow rate and provide maximum fuel economy. Engine speed is monitored and reduced a predetermined amount during steady state cruising through use of an air control solenoid to apply the controlled vacuum. The controlled vacuum is removed during acceleration or when engine speed is outside the range of steady state cruise speed.

4 Claims, 2 Drawing Figures

BINARY AND PROPORTIONAL CONTROL FOR A FEEDBACK CARBURETOR

FIELD OF THE INVENTION

This invention relates to electronic control systems for an internal combustion engine and more particularly to a control system for a feedback carburetor which provides improved fuel economy for marine engines.

BACKGROUND OF THE INVENTION

The basic principals of electronic feedback carburetor systems for internal combustion engines are known and described in a number of prior art U.S. patents. See for example U.S. Pat. No. 4,252,098 granted to L. W. Tomczak et al on Feb. 24, 1981. Generally, such systems apply electronics technology to well known carburetor systems to control the fuel flow rate, the air/fuel ratio, or other parameters necessary for efficient operation of an internal combustion engine.

Such systems are designed to reduce exhaust emissions, improve fuel economy and in general obtain satisfactory operation of the internal combustion engine. Depending on system cost and operational parameters, such systems may utilize relatively crude and unsophisticated technology or elaborate and complicated technology to accomplish these objectives. However, none of the known systems provide improved fuel economy with relatively simple and inexpensive technology, while retaining accurate and reliable system operation with ready adaptation to a variety of internal combustion engines.

It is, therefore, a general object of the instant invention to provide a low cost and highly efficient control system for a feedback carburetor.

It is another object of the instant invention to provide a control system for a feedback carburetor which improves fuel economy for marine engines.

It is a still further object of the instant invention to provide improved fuel economy for a marine engine with use of minimal hardware adaptable to a wide variety of internal combustion engines.

A number of additional prior art U.S. patents are directed to control systems for internal combustion engines in which the control system automatically and continuously seeks the optimum air/fuel mixture to be supplied to the engine. Examples of such systems are shown in U.S. Pat. No. 4,368,707 to E. Leshner et al, U.S. Pat. No. 4,099,493 to Latsch et al and U.S. Pat. No. 3,789,816 to Taplin et al. The systems described in the aforementioned U.S. patents apply various techniques in optimizing the air/fuel mixture supplied to an associated internal combustion engine, but each of these references have one technique in common, that is, each of these prior art systems monitor the rate of change of engine RPM in an attempt to optimize the air/fuel mixture.

Monitoring engine RPM rate of change to optimize the air/fuel mixture is acceptable for most internal combustion engines and especially for such engines in which the RPM rate of change in indicative of engine "roughness" or other engine conditions pointing to approach of the engine lean limit. For marine engines, however, engine RPM rate of change is not an acceptable parameter to monitor in order to optimize the air/fuel mixture as the engine RPM rate of change does not necessarily indicate engine "roughness" and/or an approach to the lean limit of engine operation. This is a result of wave action in the marine environment in which the marine engine propeller is often repeatedly removed from and inserted into the water causing rapid changes in engine RPM not related to engine "roughness" and/or approach to the lean limit.

It is, therefore, a further object of the instant invention to provide a control system for a feedback carburetor which is not dependent on engine RPM rate of change.

SUMMARY OF THE INVENTION

In accordance with a first embodiment of the invention the air/fuel ratio for an internal combustion marine engine is controlled by a feedback carburetor having associated therewith a fuel bowl to which a controlled vacuum is applied to control the fuel flow rate.

It is a feature of the invention that an analog signal is generated indicative of engine RPM and the analog signal is monitored to determine steady state engine RPM.

It is a further feature of the invention that during steady state operation the vacuum is applied to the fuel bowl at a fixed and predetermined controlled rate to lean-out the engine and reduce engine RPM a predetermined amount at said fixed and predetermined controlled rate.

It is a still further feature of the invention that after engine RPM decreases by the predetermined amount the controlled vacuum is decreased at the fuel bowl to allow engine RPM to increase and subsequent thereto the lean out operation is repeated.

These and other objects and features of the invention will be more fully appreciated from the following detailed description when taken in conjunction with the accompanying drawings, in which:

DETAILED DESCRIPTION

Figure 1:
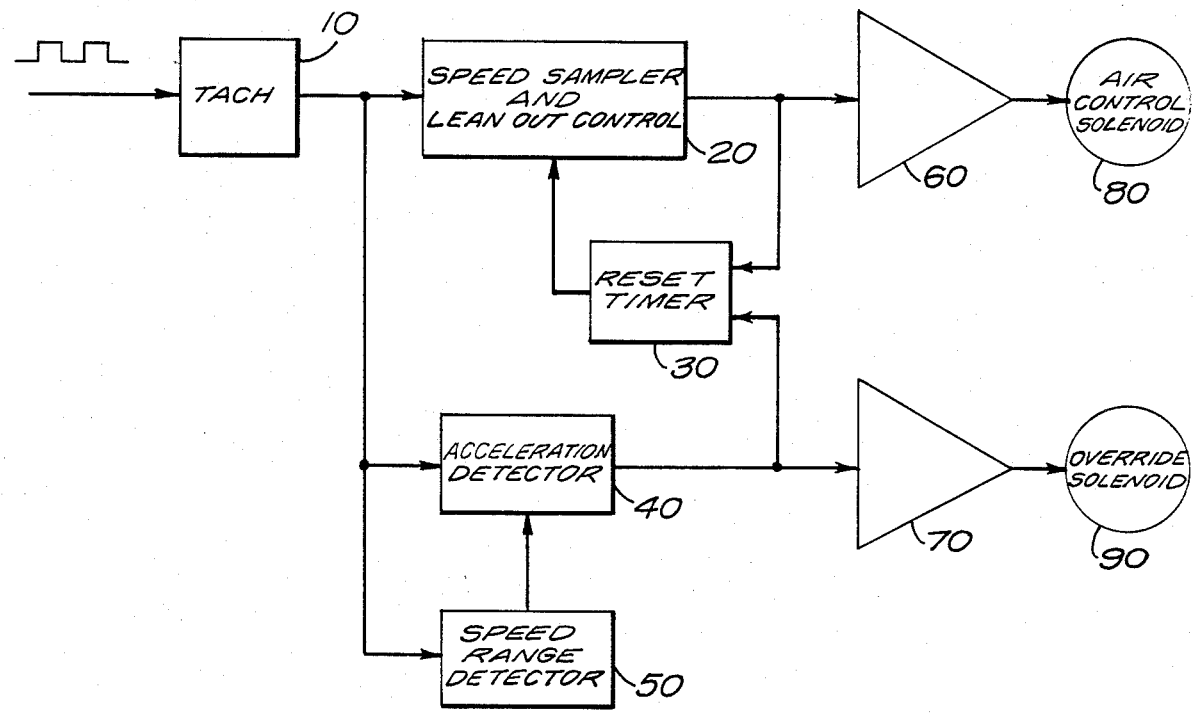
FIG. 1 is a block diagram of a first embodiment of the invention illustrating binary control of a feedback carburetor.

Referring now to FIG. 1 and a first embodiment of the invention, there is shown a binary control system for a feedback carburetor which will lean out carburetor operation through use of an air solenoid to provide improved fuel economy for an internal combustion engine and in particular for marine internal combustion engines.

Tachometer 10 provides an analog tachometer signal indicative of engine speed which is applied to speed range detector 50, acceleration detector 40, and speed sampler and lean out control circuit 20. Speed sampler and lean out control circuit 20 samples and holds the analog voltage indicative of engine speed and then applies a vacuum to the fuel bowl of the carburetor for the internal combustion engine. The vacuum is applied at a controlled rate through solenoid valve 80 resulting in a controlled decrease in the fuel flow rate. As the fuel flow rate decreases, engine speed will fall off until engine speed amount a predetermined drop, for example 50 RPM. Amplifier 60 functions to apply the output signal from speed sampler and lean out control circuit 20 to air control solenoid 80.

Reset timer 30 is triggered at the time that engine speed drops the predetermined amount of, for example, 50 RPM. Activation of the reset timer renders speed sampler and lean out control circuit 20 inoperable permitting the fuel flow rate to begin to increase. Fuel flow rate recovery is permitted for a predetermined period of time, for example three seconds, at which time the timer is reset, engine speed is again sampled, and the entire cycle just described is repeated.

Speed sampler and lean-out control circuit 20 is described in detail in co-pending U.S. patent application Ser. No. 305,900, assigned to the same assignee as the instant application, the teachings of U.S. patent application, Ser. No. 305,900, being expressly incorporated herein by reference.

The lean-out cycle described above is interrupted during acceleration, or when engine speed is out of the cruise range. More particularly, acceleration detector 40 detects acceleration of the associated internal combustion engine, and generates a control signal for application to override solenoid 90 via amplifier 70. The override solenoid, when operated, enables rapid pressurization of the fuel bowl and a return to normal fuel flow rate conditions. This control signal also serves to activate reset timer 30, rendering speed sampler and lean out control circuit 20 inoperative in the manner described above. Speed range detector 50 also interrupts the lean out cycle when engine speed is out of the cruise range. A predetermined cruise range can be preset by the engine operator and when the engine RPM is out of this range override solenoid 90 will again be operated to ensure rapid pressurization of the fuel bowl and a return to normal fuel flow rate.

The system shown in FIG. 1 provides both a failsafe and a failsolf mode, with failsolf being defined as permitting operation of the associated internal combustion engine, but at reduced capability. Failsafe is provided by utilizing an air control solenoid that yields a normal fuel flow in the relaxed state. Also, since the system uses manifold vacuum a second failsafe is provided at or near wide open throttle when the vacuum approachs zero. Failsolf is provided by selecting the orifice to the air control solenoid, so that the carburetor lean out operation is limited in the event the solenoid is held in an open state.

Figure 2:
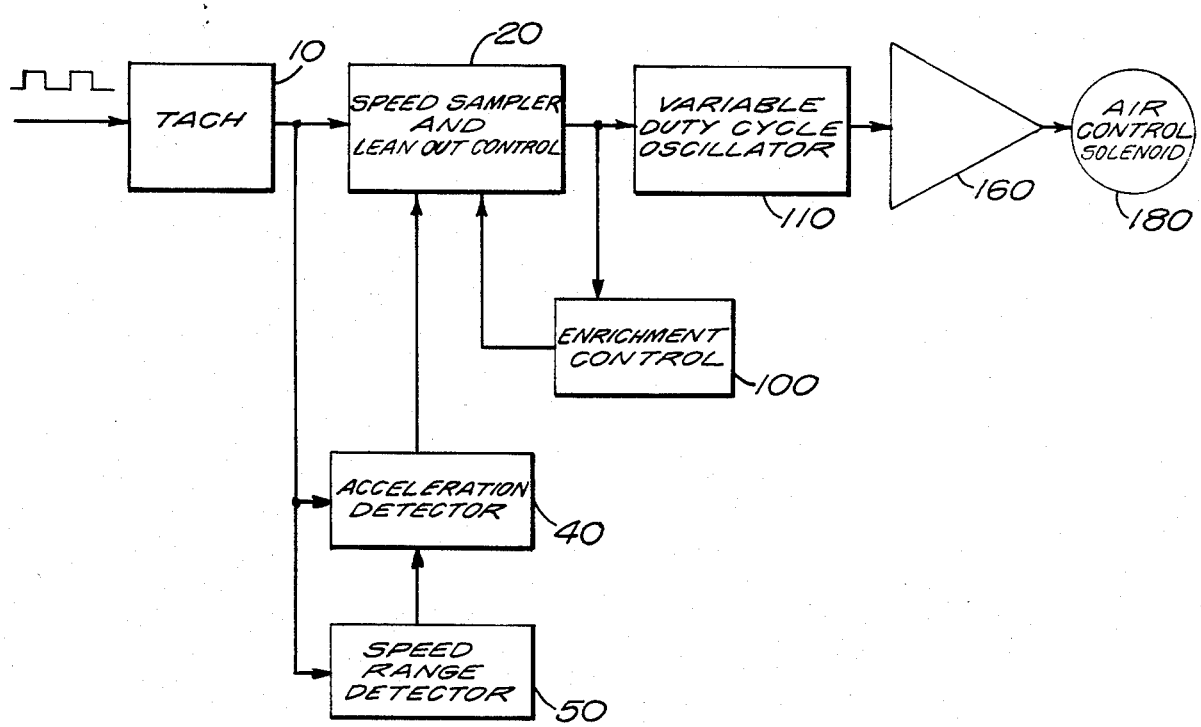
FIG. 2 is a block diagram of a second embodiment of the invention illustrating proportional control for a feedback carburetor.

Referring now to FIG. 2, there is shown a second embodiment of the invention, wherein proportional control is provided for a feedback carburetor to accomplish improved fuel economy in an internal combustion engine. The proportional control circuit in FIG. 2, like the binary control circuit in FIG. 1, functions when the associated internal combustion engine is at a steady state cruise speed. During this interval, speed sampler and lean out control circuit 20 will sample and hold the output voltage from tachometer 10, which provides the same signal as did tachometer 10 in FIG. 1. Speed sampler and lean-out control circuit 20 then proceeds to gradually reduce the control voltage applied to variable duty cycle oscillator 110, which serves to reduce the duty cycle of this oscillator.

Air control solenoid 180 operates as a two-way control valve, to allow the fuel bowl to be vented to atmospheric pressure in the relaxed state or manifold vacuum in the energized state. The output of variable duty cycle oscillator 110, operating at an exemplary frequency of 40 Hertz, is applied to air controlled solenoid 180 via amplifier 160, and serves to hold the solenoid in the relaxed state when the controlling voltage is at its high limit, and as it declines the solenoid moves towards a fully energized state. Therefore, the control voltage from speed sampler and lean out control circuit 20 controls variable duty cycle oscillator 110, which in turn operates the two-way valve from between a relaxed state, when the controlling voltage is at its high limit, to a fully energized state when the controlling voltage is at its low limit.

When speed sampler and lean out control circuit 20 determines that engine speed has been reduced by a predetermined amount, for example 50 RPM, the voltage controlling variable duty cycle oscillator 110 will gradually rise to permit a recovery to normal fuel flow rates. Engine speed is then resampled and the cycle just described is repeated.

As with the embodiment of FIG. 1, the lean-out cycle is interrupted during acceleration or when engine speed is out of the cruise range. Enrichment control circuit 100 functions in conjunction with acceleration detector 40 while speed range detector 50 detects operation beyond a predetermined cruise range.

The following disclosure and description of the invention is illustrative and explanatory thereof and various changes in the details of the illustrated construction may be made within the spirit of the appended claims without departing from the spirit of the invention.

I claim:

1. In an internal combustion engine, subject to rapid variations in the RPM rate of change, wherein a combustible air/fuel mixture is introduced into combustion chambers of the engine with the air/fuel ratio of the mixture being controlled by feedback carburetor means having associated therewith a fuel bowl to which a controlled vacuum is applied to control the fuel flow rate, the improvement comprising; means for generating an analog signal indicative of engine RPM, means responsive to said analog signal for determining a steady state RPM for said internal combustion engine, means responsive to operation of said engine at said steady state RPM for applying said vacuum to said fuel bowl at a fixed and predetermined controlled rate until a predetermined decrease in said engine RPM has been achieved, regardless of time duration required to achieve said predetermined decrease, means for indicating said predetermined decrease in engine RPM and means responsive to said predetermined decrease in engine RPM for reducing said vacuum applied to said fuel bowl, wherein there is further included means for timing a predetermined interval during which said vacuum applied to said fuel bowl is reduced and means responsive to the expiration of said predetermined interval for reapplying said vacuum to said fuel bowl.

2. In an internal combustion engine in accordance with claim 1, wherein said applying means include an air control solenoid.

3. In an internal combustion engine in accordance with claim 2, wherein an oscillator, having a variable duty cycle, controls said air control solenoid.

4. In an internal combustion engine in accordance with claim 2 wherein said determining means generates a control voltage in response to changes in engine RPM said air control solenoid operating in response to said control voltage.

* * * * *